United States Patent [19]
Hickman

[11] 3,794,343
[45] Feb. 26, 1974

[54] INDEPENDENT WHEEL VEHICLE SPRING SUSPENSION
[76] Inventor: Albert F. Hickman, 8009 N. State Rd., Eden, N.Y. 14045
[22] Filed: Dec. 26, 1972
[21] Appl. No.: 318,696

Related U.S. Application Data
[63] Continuation-in-part of Ser. No. 133,566, April 13, 1971, abandoned.

[52] U.S. Cl............ 280/124 A, 267/63 A, 267/21 A
[51] Int. Cl............................ B60g 11/22, F16f 1/36
[58] Field of Search.......... 280/124 R, 124 A, 81 R; 267/15 R, 63 R, 63 A, 21 R, 21 A, 57.1 R, 57.1 A

[56] References Cited
UNITED STATES PATENTS
2,253,217   8/1941   Wenthe........................... 280/124 A
2,706,113   4/1955   Hickman......................... 280/124 R Primary Examiner—Philip Goodman
Assistant Examiner—John A. Carroll
Attorney, Agent, or Firm—Harold I. Popp

[57] ABSTRACT

The vehicle suspension is a so-called independent wheel suspension, each wheel being journalled on a stub axle fixed to the free end of a straight arm extending lengthwise of the line of travel and the other end of which is fixed to a transverse hub structure journalled in spaced frame bearings. This arm is very short, the axis of the hub structure intersecting the wheel so that that portion of each arm between the axes of each wheel and its hub structure is shorter than the radius of the wheel. Resilient support for the frame on its arms is in the form of at least one elastomeric rubber body above each arm. Telescopic shock absorbers are severally between the free ends of their arms and their frame brackets so that they have a long action and can be of light weight, inexpensive construction.

7 Claims, 4 Drawing Figures

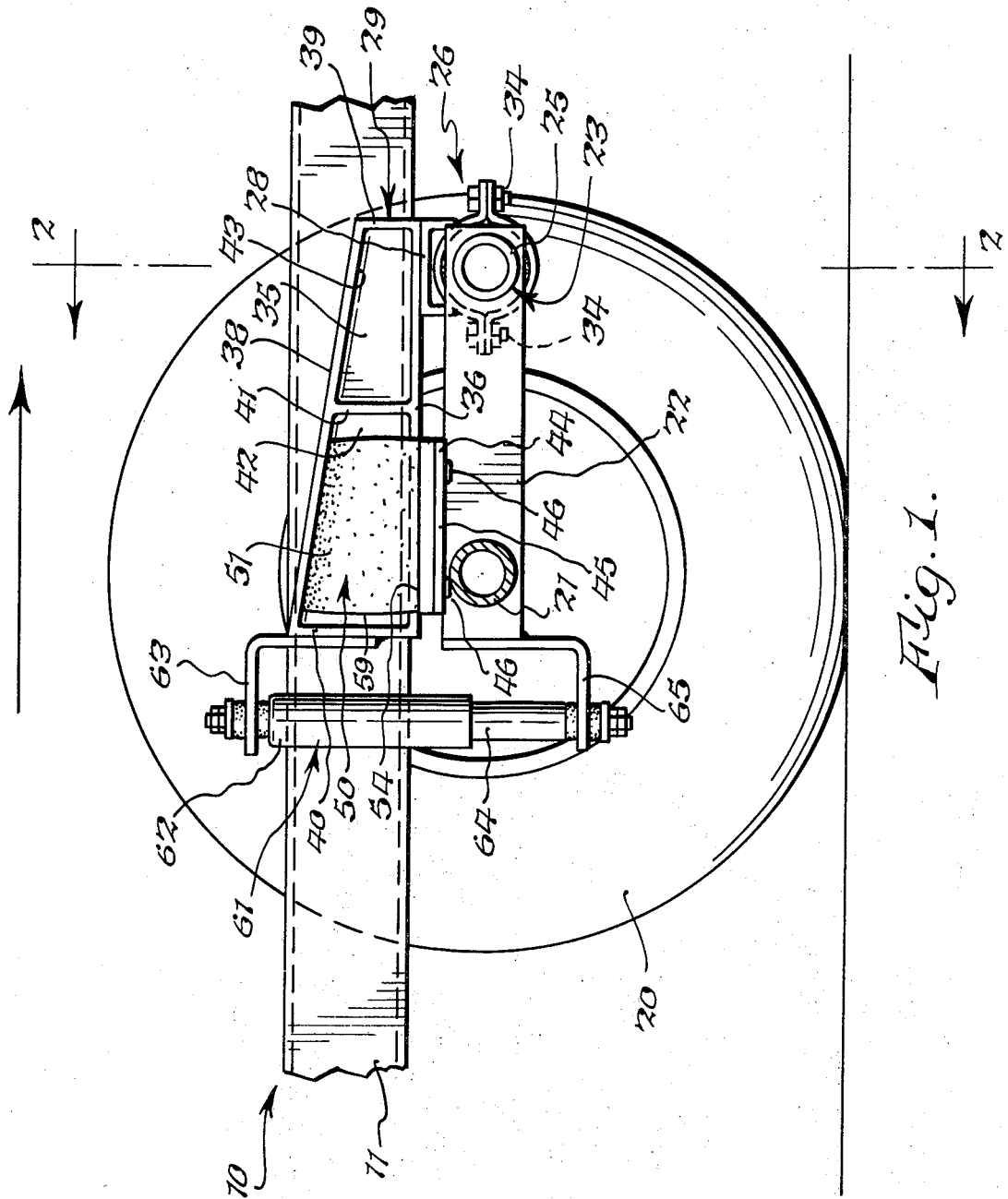

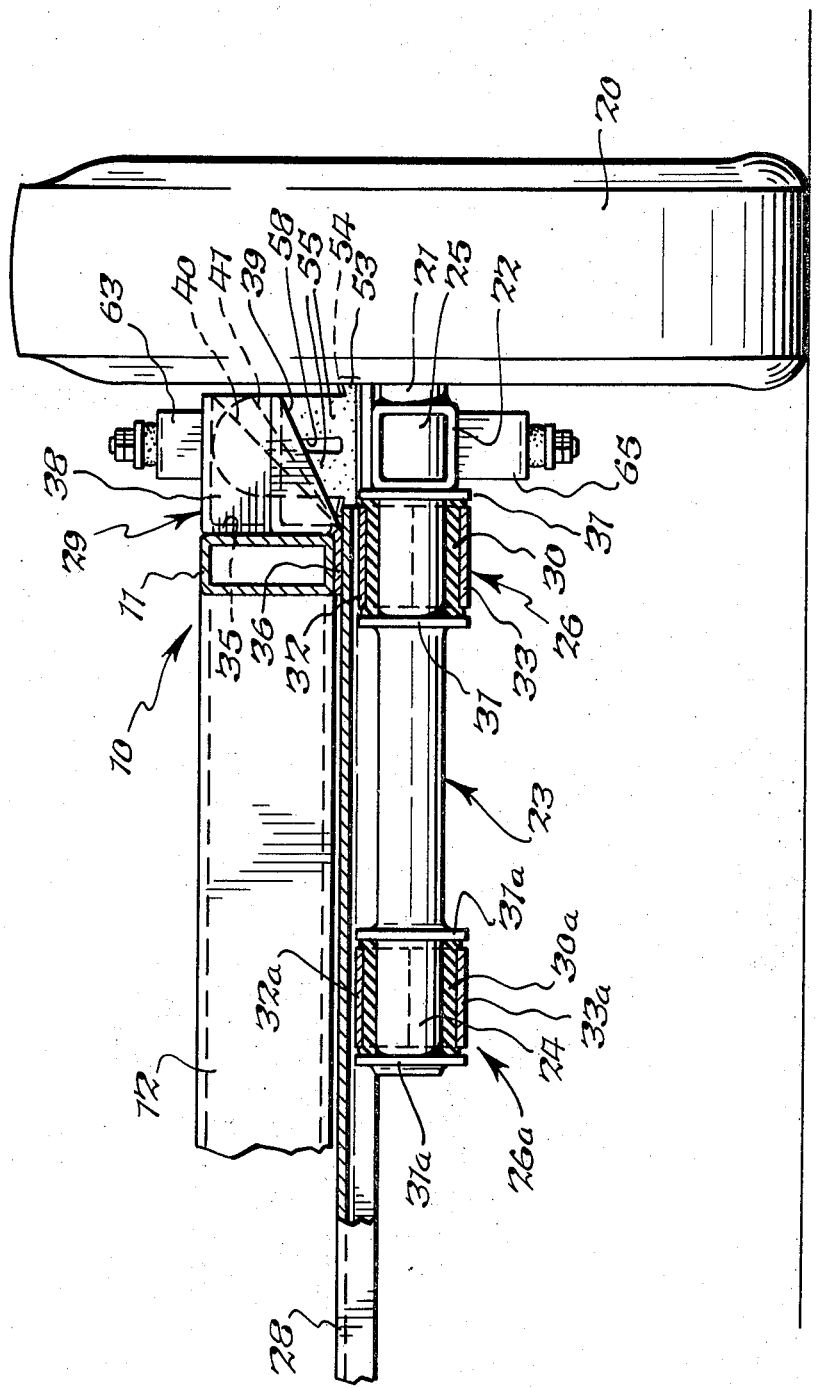

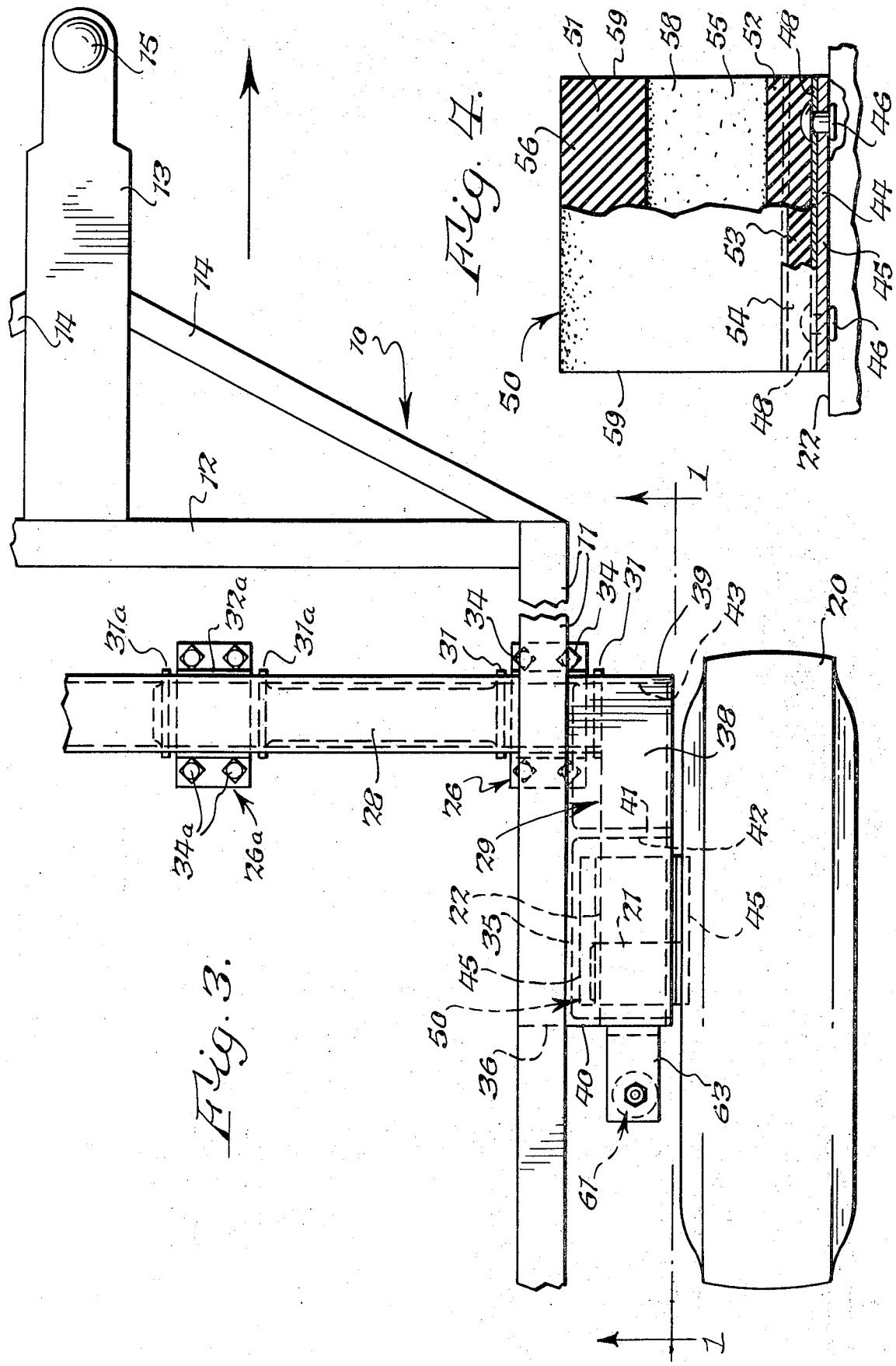

INDEPENDENT WHEEL VEHICLE SPRING SUSPENSION

This application is a continuation-in-part of my copending application for Independent Wheel Shear Rubber Spring Suspension for Vehicles, filed Apr. 13, 1971 under Ser. No. 133,566 now abandoned.

An object is to provide a very simple, rugged and friction free independent wheel suspension in which the resilient support for the frame is essentially provided by elastomeric rubber bodies.

Another object is to provide such a suspension which is adapted to standard frame and wheel track widths as well as standard wheel housings.

Another object is to provide a simple and highly effective mounting for long action, light weight telescopic shock absorbers.

Another object is to provide such a suspension which is substantially concealed behind the wheels.

Other objects and advantages will appear from the following description and drawings in which:

FIG. 1 is a fragmentary side elevational view of a vehicle frame supported at each side by a spring suspension embodying the present invention, this view being taken, for clarity, generally on line 1—1, FIG. 3. In the first three figures the suspension parts are shown in their position in which the frame is carrying a normal load and the forward direction of travel is indicated by a large arrow above the right hand sides of FIGS. 1 and 3.

FIG. 2 is an enlarged fragmentary vertical section taken generally on line 2—2, FIG. 1.

FIG. 3 is a fragmentary top plan view of the vehicle frame supported by the subject spring suspension.

FIG. 4 is a side elevational view, partly in section, of the elastomeric rubber body used, compressively, at each side of the vehicle, to provide substantially the entire resilient support for the vehicle frame and its load.

The vehicle frame can be of any suitable construction and is shown as a trailer frame 10 comprising a pair of main longitudinal horizontal side frame beams 11 which can be connected by cross bars 12 and as having a tongue 13 reinforced by diagonal frame bars 14. Any suitable means 15 can be provided at the front end of the tongue for attachment to the rear of the towing vehicle (not shown).

The entire vehicle frame, together with the present spring suspension, is preferably constructed substantially symmetrically about the vertical center plane of the vehicle frame, and hence the independent wheel suspensions at opposite sides of the frame are substantially identical.

The frame 10 is supported on rubber tired supporting wheels 20, which can be single wheels, as shown, or dual tired wheels, that is, pairs of rim structures bolted together side by side. In either case a stub axle 21 is journalled on each rubber tired wheel in any suitable manner (not shown), these stub axles extending horizontally transversely of the line of vehicle travel.

Each stub axle 21 is welded or otherwise fixed to the outer or free end of an arm 22 which can be of any suitable form but is shown as being of straight form and of tubular rectangular form in cross section with its stub axle extending through its side walls at its outer end and being welded thereto.

A tubular horizontal hub structure 23 is arranged under each main longitudinal side frame beam 11 generally parallel with the axis of rotation of its wheel 20, preferably in advance thereof, with reference to the forward direction of vehicle travel. This hub structure has a cylindrical inboard end 24 projecting toward the vertical center plane of the vehicle frame, and a cylindrical coaxial outboard end 25 projecting outwardly from under its longitudinal side frame beam 11 toward, and axially in line with, the tire of its wheel 20. This outboard end 25 extends through the side walls of the inner end of the corresponding arm 22 and is welded thereto. The axis of each hub structure 23 thereby intersects its wheel 20 so that the length of the arm 22, between this axis and the axis of the wheel 20, is shorter than the radius of the wheel 20. By this arrangement each arm 22 can be made short and of light weight and still perform its heavy duty bending and torsional service.

The cylindrical outboard and inboard ends 25, 24 of the two hub structures 23, through outboard and inboard bearings 26, 26a, respectively, support a cross bolster 28 in the form of an inverted metal channel the opposite ends of which are arranged under the main longitudinal side frame beams 11. Each end of the bolster is suitably secured to the underside of a frame bracket 29, hereinafter described.

The bearings 26, 26a are identical in construction and hence the same description applies to both, the corresponding parts of the bearing 26a being distinguished by the suffix a. Each outboard bearing 26 comprises a rubber bushing 30 embracing the tubular outboard end 25 of the corresponding hub structure 23 and confined at its ends between a pair of metal rings 31 welded to and projecting radially from the outboard end 25, each pair of these rings serving to prevent the outward axial displacement of the rubber bushing 30 therebetween. Each rubber bushing 30 is embraced by an upper half bearing housing 32 which can be welded inside the outer extremity of the bolster cross channel 28 in any suitable manner and by a lower half bearing housing 33 secured, as by bolts 34, to its upper half bearing housing 32 so as to compress the rubber bushing 30 against the periphery of the outer cylindrical end 25 of its hub member 23.

Each frame bracket 29 is Z-shaped in cross section, having a vertical side wall 35 contacting the outer vertical face of its main longitudinal side frame beam 11; a bottom flange 36 contacting the bottom face thereof; and a top flange 38 projecting horizontally outwardly toward the companion wheel 20. The bottom flange 36 is also suitably secured to the corresponding end top face of the bolster channel 28. The top edge of each side wall 35 and hence the top flange 38 projecting therefrom preferably inclines downwardly and rearwardly with reference to the line of vehicle travel at the approximate angle of 9° shown. Each angular top flange 38 is preferably reinforced by three triangular gussets welded to its underside and to the outside face of its vertical side wall 35. With reference to the line of vehicle travel, the small front gusset 39 connects the front edges of the side wall 35 and top flange 38; the large rear gusset 40 connects the rear edges thereof; and an intermediate size centrally located gusset 41. This last gusset 41 forms a relatively long and high open rear chamber 42 between it and the rear gusset 40 and a relatively short and low open front chamber 43 between it and the front gusset 39. Each frame bracket 29 is preferably removably secured to the frame 10 by bolts or other means which, for clarity, are not shown.

Below each chamber 42 a rectangular top plate 44 is welded to the top of the companion arm 22, this top plate being slightly wider than the arm with its opposite side edges 45 projecting outwardly therefrom. To these projecting side edges is secured, as by rivets 46, the sheet metal base plate 48 of a compression rubber spring forming the subject of my U.S. Pat. No. 3,542,353, dated Nov. 24, 1970, and to which reference is made for a more detailed description thereof.

In general, each rubber spring 50 comprises a single rubber body 51 which is substantially longer in the direction of vehicle travel than transversely thereof. This rubber body has a rectangular base 52 mounted on its rectangular base plate 48. This rubber body base 52 has longitudinal side base flanges 53 which project outwardly and around which are compressively wrapped C-shaped side flanges 54 of the base plate 48. Each body also includes relatively thick longitudinal side walls 55 which converge upwardly and the tops of which are joined by an integral arch portion 56 of the rubber body. The base 52, side walls 55 and arching top 51 forms a through bore 58 of somewhat dew-drop form in cross section which extends longitudinally through the rubber body 50 from one end face 59 thereof to the opposite end face 59 thereof. In its unstressed state, the rubber body 50 is, as shown in FIG. 4, of substantially uniform cross sectional shape from one end face 59 thereof to the other, although this is not critical to the invention.

The rubber body 50, so riveted on top of each arm 22, projects upwardly into each frame bracket chamber 42 to engage and support the top flange 38 of this frame bracket. Since this top flange 38 (relative to the line of vehicle travel) is in rearwardly converging relation to the arm 22, it will be seen that the rubber body 50 will first be compressed at its front top corner when the weight of the frame 11 (and body) is imposed on it, so that, initially, the load is predominantly borne by the forward portions of the rubber bodies which are compressed in the manner shown in FIG. 1.

Each wheel is controlled, essentially in its rebound movement, by a telescopic shock absorber 61. Its outer upper telescopic part 62 is secured by any suitable flexible joint to an angle iron 63 fixed to and rising from the rear end of each frame bracket 29. Its inner bottom telescopic part 64 is secured by any suitable flexible joint to an angle iron 65 welded to the rear or free end of each arm 22 to project rearwardly therefrom. By this mounting of each telescopic shock absorber 61 between an angle bracket 65 projecting rearwardly from the free end of its arm 22 and a frame bracket 63, a lighter weight, cheaper and longer action shock absorber can be employed, which is also relatively accessible for repair or replacement since the shock absorbers are the only parts of the suspension which will not outlive the vehicle.

OPERATION

The forward direction of vehicle travel is shown by the large arrows above the right of FIGS. 1 and 3, and in the operation of the suspension, the upward movement of either wheel 20 and its stub axle 21 effects upward movement of the rear or free end of its tubular arm 22 and clockwise movement, as viewed in FIG. 1, of the hub member 23 fixed to this arm, such movement being permitted by the flexible rubber bushings 30, 30a of its outboard and inboard frame bearings 26, 26a.

This movement of each arm 22 is transmitted upwardly through its rubber body 50 to the top flange 38 of the Z-shaped frame bracket 29. Since this top flange 38 is at the angle to the arm 22 shown in FIG. 1, this rubber body 50 is first compressed vertically at its front upper corner, progressively toward its rear upper corner (with reference to the line of vehicle travel). Accordingly, the empty vehicle is, in effect, supported by very resilient first stage springs. As the load builds up, however, each arm 22 comes more and more into parallelism with the top flange 38 of its frame bracket 29. Accordingly, the full cross section of each rubber body 50 comes into action to support heavy loads and impacts in the manner described in greater detail in my said patent.

The bolster channel 28 is also secured to these frame brackets 29 and since this bolster carries all four rubber bushed frame bearings 26, 26a, it will be seen that the entire suspension, with the wheels 20, can be removed for ready repair or replacement by merely detaching the frame brackets 29 from the frame 10.

The following features will particularly be noted:

It is important that the pair of elastomeric rubber bodies 50 be located between the wheels 20 and the main longitudinal side frame beams 11 in order to have these elastomeric rubber bodies as low as possible with reference to the arms 22. The higher these elastomeric rubber bodies 50, the greater the working stress on them and other parts of the suspension.

The entire suspension, including the wheels 20, can be removed by detaching the frame brackets 29 from the frame, and a very simple and effective mounting for each telescopic shock absorber 61 is provided between the ends of its arm 22 and frame bracket 29.

Long and less expensive telescopic shock absorbers 61 can be employed by their location between brackets 65 projecting rearwardly beyond the free ends of the arms 22 and frame brackets 29, 63.

By "rubber" is meant an elastomer such as natural or synthetic rubber or mixtures thereof, and by "wheel" is meant the ground engaging means 20 supporting the stub axles whether in the form of the single wheel and tire shown or in the form of a dual tired wheel.

I claim:

1. A vehicle spring suspension adapted to be interposed between each side of a vehicle frame member and a rubber tired supporting wheel having a road engaging tread, wherein the improvement comprises a generally horizontal hub structure for each suspension arranged under the corresponding side of the frame member and generally parallel with the axis of rotation of its wheel, each hub structure having an inboard end extending toward the vertical center plane of the vehicle frame member and an outboard end projecting outwardly from under said frame member, a relatively straight arm member having one end arranged below the space between each wheel and the corresponding side of said frame member and fixed to said outboard end of the corresponding hub structure to project radially therefrom toward said axis of rotation of said wheel, said hub structure including a hub axis which intersects said wheel so as to cause the portion of said arm member between said hub axis and said axis of rotation of said wheel to be shorter than the radius of said wheel, a stub axle projecting horizontally outwardly laterally from the other end of each arm member along said axis of rotation of and journalled on its wheel, an inboard frame bearing connecting said inboard end of each hub structure to the frame member, an outboard frame bearing connecting the outboard end of each hub structure to the frame member, and means providing resilient support for the frame member on each of said arm members, comprising at least one elastomeric rubber body arranged above each arm member inwardly of the corresponding wheel, a bracket fixed to one of said members at each side of said frame member and fixed to one side of the corresponding elastomeric rubber body, and means operatively engaging the other side of each elastomeric rubber body to the other of said members.

2. A vehicle spring suspension as set forth in claim 1 wherein said elastomeric rubber body is compressed by said members to expand transversely of the line of force therefrom.

3. A vehicle spring suspension adapted to be interposed between each side of a vehicle frame member and a rubber tired supporting wheel having a road engaging tread, wherein the improvement comprises a generally horizontal hub structure for each suspension arranged under the corresponding side of the frame member and generally parallel with the axis of rotation of its wheel, each hub structure having an inboard end extending toward the vertical center plane of the vehicle frame member and an outboard end projecting outwardly from under said frame member, a relatively straight arm member having one end arranged below the space between each wheel and the corresponding side of said frame member and fixed to said outboard end of the corresponding hub structure to project radially therefrom toward said axis of rotation of said wheel, a stub axle projecting horizontally outwardly laterally from the other end of each arm member along said axis of rotation of and journalled on its wheel, an inboard frame bearing connecting said inboard end of each hub structure to the frame member, an outboard frame bearing connecting the outboard end of each hub structure to the frame member, and means providing resilient support for the frame member on each of said arm members, comprising an elastomeric rubber body arranged above each arm member inwardly of the corresponding wheel, a bracket fixed to one of said members at each side of said frame member and fixed to one side of the corresponding elastomeric rubber body, and means operatively engaging the other side of each elastomeric rubber body to the other of said members, each elastomeric rubber body being in a vertical plane intersecting said axis of rotation of its wheel.

4. A vehicle spring suspension adapted to be interposed between each side of a vehicle frame member and a rubber tired supporting wheel having a road engaging tread, wherein the improvement comprises a generally horizontal hub structure for each suspension arranged under the corresponding side of the frame member and generally parallel with the axis of rotation of its wheel, each hub structure having an inboard end extending toward the vertical center plane of the vehicle frame member and an outboard end projecting outwardly from under said frame member, a relatively straight arm member having one end arranged below the space between each wheel and the corresponding side of said frame member and fixed to said outboard end of the corresponding hub structure to project radially therefrom toward said axis of rotation of said wheel, a stub axle projecting horizontally outwardly laterally from the other end of each arm member along said axis of rotation of and journalled on its wheel, an inboard frame bearing connecting said inboard end of each hub structure to the frame member, an outboard frame bearing connecting the outboard end of each hub structure to the frame member, and means providing resilient support for the frame member on each of said arm members, comprising an elastomeric rubber body arranged above each arm member inwardly of the corresponding wheel, a bracket fixed to one of said members at each side of said frame member and fixed to one side of the corresponding elastomeric rubber body, and means operatively engaging the other side of each elastomeric rubber body to the other of said members, each of said elastomeric rubber bodies having a mojor generally horizontal dimension extending lengthwise of its arm member to provide an adequate volume of rubber for the service required.

5. A vehicle spring suspension adapted to be interposed between each side of a vehicle frame member and a rubber tired supporting wheel having a road engaging tread, wherein the improvement comprises a generally horizontal hub structure for each suspension arranged under the corresponding side of the frame member and generally parallel with the axis of rotation of its wheel, each hub structure having an inboard end extending toward the vertical center plane of the vehicle frame member and an outboard end projecting outwardly from under said frame member, a relatively straight arm member having one end arranged below the space between each wheel and the corresponding side of said frame member and fixed to said outboard end of the corresponding hub structure to project radially therefrom toward said axis of rotation of said wheel, a stub axle projecting horizontally outwardly laterally from the other end of each arm member along said axis of rotation of and journalled on its wheel, an inboard frame bearing connecting said inboard end of each hub structure to the frame member, an outboard frame bearing connecting the outboard end of each hub structure to the frame member, and means providing resilient support for the frame member on each of said arm members, comprising an elastomeric rubber body arranged above each arm member inwardly of the corresponding wheel, a bracket fixed to one of said members at each side of said frame member and fixed to one side of the corresponding elastomeric rubber body, means operatively connecting the other side of each elastomeric rubber body to the other of said members, and a telescopic shock absorber operatively interposed between said other end of each arm member and the corresponding side of said frame member.

6. A vehicle spring suspension as set forth in claim 5 wherein said other end of each arm member projects beyond its stub axle and one end of said telescopic shock absorber is pivotally connected to such projecting end.

7. A vehicle spring suspension as set forth in claim 6 wherein each said bracket is a frame bracket fixed to the corresponding side of said frame member, and wherein the other end of said telescopic shock absorber is pivotally connected to said frame bracket.

* * * * *